US005763804A

United States Patent [19]

Rigopulos et al.

[11] Patent Number: 5,763,804

[45] Date of Patent: Jun. 9, 1998

[54] REAL-TIME MUSIC CREATION

[75] Inventors: Alexander P. Rigopulos, Boxford; Eran B. Egozy, Cambridge, both of Mass.

[73] Assignee: Harmonix Music Systems, Inc., Cambridge, Mass.

[21] Appl. No.: 757,394

[22] Filed: Nov. 27, 1996

Related U.S. Application Data

[63] Continuation of Ser. No. 543,768, Oct. 16, 1995.

[51] Int. Cl.[6] ................................ G01H 1/00; G01H 1/40

[52] U.S. Cl. ................................ 84/635; 84/609; 84/611; 84/651

[58] Field of Search ..................... 84/609–613, 622–625, 84/634–637, 649–652, 659–660

[56] References Cited

U.S. PATENT DOCUMENTS

| | | | |
|---|---|---|---|
| 3,813,472 | 5/1974 | Hirano | 84/1.03 |
| 5,074,182 | 12/1991 | Capps et al. | 84/609 |
| 5,099,738 | 3/1992 | Hotz | 84/617 |
| 5,146,833 | 9/1992 | Lui | 84/462 |
| 5,177,311 | 1/1993 | Suzuki et al. | 84/600 |
| 5,254,803 | 10/1993 | Terao | 84/609 |
| 5,391,829 | 2/1995 | Hasebe et al. | 84/622 |
| 5,393,926 | 2/1995 | Johnson | 84/610 |
| 5,399,799 | 3/1995 | Gabriel | 84/609 |
| 5,403,970 | 4/1995 | Aoki | 84/609 |
| 5,440,071 | 8/1995 | Johnson | 84/637 |
| 5,451,709 | 9/1995 | Minamitaka | 84/609 |
| 5,465,384 | 11/1995 | Bejan et al. | 455/2 |
| 5,488,196 | 1/1996 | Zimmerman et al. | 84/612 |
| 5,491,297 | 2/1996 | Johnson et al. | 84/609 |

OTHER PUBLICATIONS

International Searching Authority/European Patent Office, International Search Report, Jan. 29, 1997 (8 pp.).

*Primary Examiner*—Jonathan Wysocki
*Assistant Examiner*—Marlon T. Fletcher
*Attorney, Agent, or Firm*—Testa, Hurwitz & Thibeault, LLP

[57] ABSTRACT

An electronic music system has an input device, one or more computer storage media, a rhythm generator, a pitch selector, and a sound generator. The input device generates rhythm-related input signals and pitch-related input signals in response to manipulations of the input device by a user attempting to create and play a solo. The computer storage media have a plurality of user-selectable musical accompaniment tracks over which the user can create and play the solo and a plurality of rhythm blocks wherein each rhythm block defines, for at least one note, at least a time at which the note should be played. The computer storage media also store at least a portion of the solo created by the user over a predetermined time interval in the immediate past. The rhythm generator receives the rhythm-related input signals from the input device, selects one of the rhythm blocks from the computer storage media based on the rhythm-related input signals, and outputs an instruction to play the note at the time defined by the selected rhythm block. The pitch selector receives the pitch-related input signals from the input device and selects an appropriate pitch based on the pitch-related input signals, the user-selected musical accompaniment track, and the stored solo information. The pitch selector then outputs that appropriate pitch. The sound generator receives instructions from the rhythm generator, pitches from the pitch selector, and the user-selected musical accompaniment track and generates an audio signal representative of the user-created solo and the accompaniment track.

16 Claims, 13 Drawing Sheets

JOYSTICK: AXES

JOYSTICK: AXES

SET UP

EX. 1
NAME: "8TH NOTES"
LENGTH: 480 TICKS (1 BEAT)
EVENT LIST: 0 240
DYNAMICS: 84 84
DURATIONS: 240 240
MUSICAL EQUIVALENT:

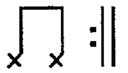

FIG. 6A

EX. 2
NAME: "SYNCOPATED 16TH NOTES"
LENGTH: 480 TICKS (1 BEAT)
EVENT LIST: 120 360
DYNAMICS: 84 84
DURATIONS: 120 120
MUSICAL EQUIVALENT:

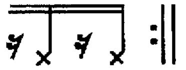

FIG. 6B

EX. 3
NAME: "DOTTED 8TH CROSS-RHYTHM, SPARCE"
LENGTH: 720 TICKS (1.5 BEAT)
EVENT LIST: 0
DYNAMICS: 84
DURATIONS: 240
MUSICAL EQUIVALENT:

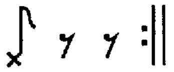

FIG. 6C

EX. 4
NAME: "8TH NOTES, OFFBEAT ACCENT"
LENGTH: 480 TICKS (1 BEAT)
EVENT LIST: 0 240
DYNAMICS: 72 96
DURATIONS: 120 240
MUSICAL EQUIVALENT:

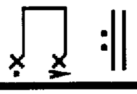

FIG. 6D

EX. 1: SLOW ROCK

SWING 0%
HALF-SHUFFLE 0%
RHTHM BLOCK CONFIGURATION:

| NORMAL | SYNCOPATED | ALTERNATE 1 | ALTERNATE 2 | (JOYSTICK) |
|---|---|---|---|---|
| 4TER NOTES | SYNC 8THS | DOTTED 8TH CROSS, SPARSE | 4TER TRIPLETS, ONBEAT | LEFT |
| 8TH NOTES | SYNC 16THS | DOTTED 8TH CROSS, FULL | 4TER TRIPLETS, OFFBEAT | : |
| 16TH NOTES | | DOTTED 16TH CROSS, SPARSE | 8TH TRIPLETS | : |
| | | DOTTED 16TH CROSS, FULL | 16TH TRIPLETS | RIGHT |

FIG. 7A

EX. 2: FAST BLUES

SWING 50%
HALF-SHUFFLE 0%
RHYTHM BLOCK CONFIGURATION:

| NORMAL & SYNCOPATED | ALTERNATE 1 | ALTERNATE 2 | (JOYSTICK) |
|---|---|---|---|
| 4TER NOTES | DOTTED 8TH CROSS, SPARSE | 4TER TRIPLETS, ONBEAT | LEFT |
| SYNC 8THS | DOTTED 8TH CROSS, FULL | 4TER TRIPLETS, OFFBEAT | : |
| 8TH NOTES | | 8TH TRIPLETS | : |
| 8TH TRIPLETS | | 16TH TRIPLETS | RIGHT |

FIG. 7B

REAL-TIME MUSIC CREATION

This is a continuation of application Ser. No. 08/543,768 filed on Oct. 16, 1995.

FIELD OF THE INVENTION

This invention relates to electronic music and, more particularly, to an electronic music system with which a non-musician can produce melodic, creative music without knowledge of music theory or the ability to play an instrument or keep time.

BACKGROUND OF THE INVENTION

Electronic keyboards and other electronic musical instruments are known. Many electronic keyboard instruments generate digital data compatible with the Musical Instrument Digital Interface (MIDI) standard. Many electronic musical instruments also provide an automatic accompaniment or background which is played by the instrument at the performer's request. With many known electronic musical instruments, in order to make organized melodic sounds which would be considered "music", the performer must actually be able to play the instrument or at least be able to strike the instrument's "actuators" (i.e., keys of a music keyboard, strings of a stringed instrument such as a guitar, etc.) in "time", meaning in some order appropriate for the time signature and tempo of the piece of music, song, or melody being played by the performer on the instrument. With other known musical instruments, the performer makes music by keying a pre-recorded melody on and off whenever desired.

U.S. Pat. No. 5,099,738 to Hotz discloses a MIDI-compatible electronic keyboard instrument that does not allow the musician to strike a wrong note. During the interval of time in which a particular chord is being played, the instrument generates, in response to the musician's depression of any key, a "correct" note (i.e., pitch) in that chord or a "correct" note in a scale which is compatible with that chord. Like other known electronic musical instruments, the time when notes are played are determined entirely by when the musician depresses a key on the keyboard. If the musician does not or cannot depress the keys at appropriate times, the result will be "correct" notes played in an unorganized, random sequence. The musician thus is given "creative input" as to the time when notes are played but does not have the option of playing an incorrect chord or note.

U.S. Pat. No. 5,393,926 to Johnson discloses a virtual MIDI guitar system. The system has a personal computer which utilizes a CD-ROM player to play back a stored audio and video accompaniment selected by a user. The accompaniment is a recording of a song with the guitar track omitted. The personal computer stores the guitar track of the song. The guitar has strings and a tremolo bar, and a user's manipulation of the strings and tremolo bar sends digital data to the personal computer. The personal computer uses that data to access and play back relevant portions of the guitar-only track, as described below. The personal computer also mixes the guitar track with the audio track from the CD-ROM player and broadcasts it through speakers while at the same time displaying the video image on a monitor connected to the personal computer. The guitar-only track contains all of the guitar notes in the sequence in which they are to be played, and it is partitioned into a sequence of frames. The guitar player is able to generate only those notes that are within the current frame and only in the order in which they appear in the current frame, "current" being determined by a clock variable which tells the elapsed time since the song began. The pace at which the notes are played within the current frame is determined by when the user strikes the strings such that the user may be able to get somewhat out of alignment with the accompaniment in any particular frame and may have some flexibility to modify or experiment with the timing of the notes of the guitar track within a frame. If the player does not play the guitar during a period associated with a given frame, none of the music within that frame will be generated. Striking strings of the guitar thus causes an otherwise silent, running, pre-recorded guitar-only track to be heard, and the guitar thus essentially operates as an on/off or play/silent button for the pre-recorded guitar track.

U.S. Pat. No. 5,074,182 to Capps et al. discloses a guitar-like instrument with encoded musical material that includes a plurality of multi-part background songs and a plurality of solo parts or "riffs" that harmonize with the background songs. A read only memory (ROM) in the instrument stores a program and the encoded musical material. Once the user has selected and started a background song, the user can trigger a guitar riff by operating some switches on the instrument. Manipulating the switches thus causes one of a plurality of pre-stored riffs to play over the selected background song.

SUMMARY OF THE INVENTION

It is an object of the invention to provide an electronic music system that non-musicians can use to generate melodic, creative music in real-time without knowledge of music theory and without the ability to play an instrument or keep time.

It is also an object to allow the user of the system to create and play easily a non-pre-recorded solo over a pre-recorded background or accompaniment track.

It is a further object to allow the user of the system to create solos without the need to strike actuators in time or otherwise physically establish and maintain the timing of the notes of the solo. The system does not require the user to, for example, keep a steady beat.

It is still another object to provide the user of the system with one or more simple controllers (e.g., a joystick which can have one or more buttons) for manipulating the system and generating the solo in real-time.

All of the complexity associated with creating music is placed in the system of the invention. A user of the system need not know anything about music or musical instruments to create music with the system. Except for the background track, the music generated by the system under the control of the user is produced in real-time and it is not simply a play back of a pre-recorded solo track.

In general, in one aspect, the invention features an electronic music system having an input mechanism, computer storage media, a rhythm generator, a pitch selector, and a sound generator. The input mechanism provides rhythm-related input signals and pitch-related input signals, for example, in response to a user's manipulations of it. In one embodiment, the user manipulates the input mechanism to create and play music (e.g., a solo line) over one of a plurality of user-selectable musical background or accompaniment tracks. In general, a solo means a composition or section for one performer. A solo can be a musical line of single pitches sounded one after another (i.e., a melody), or it can be a line that has intervals (i.e., two different pitches sounded at the same) and/or chords (i.e., three or more different pitches sounded simultaneously) as well as, or in place of, just single pitches. (In general, whenever "melody" is used hereinafter, it should be taken to mean a melody or a solo, as those two words have been defined above. Also, "solo" includes "melody" by definition.)

The computer storage media (e.g., computer memory such as RAM, a computer hard disk drive, and/or a CD-ROM drive with a CD-ROM therein) contain the user-selectable accompaniment tracks and a plurality of rhythm blocks. Each rhythm block defines, for at least one note, at least a time at which the note should be played. A rhythm block also can specify a duration and a loudness for the note, and if these are not specified by the rhythm block, default or predetermined values are used. The computer storage (e.g., RAM) also stores at least the portion of the solo created over some time interval in the immediate past. It preferably stores all of the user's solo line automatically in real-time as it is created by the user. This "past solo" information is used by the pitch selector in selecting the next pitch to output.

The rhythm generator receives the rhythm-related input signals from the input device, selects one of the rhythm blocks from storage based on the rhythm-related input signals, and then outputs a "play note" instruction which indicates the time at which to play the note as defined by the selected rhythm block. The pitch selector receives the pitch-related input signals from the input device and selects an appropriate pitch based on the pitch-related input signals, harmony and metric data in the user-selected accompaniment track, and the "past solo" information. The pitch selector then outputs that appropriate pitch. The sound generator receives both: (i) the user-selected accompaniment track; and (ii) the user-created solo track which includes timing information from the rhythm generator and pitch information from the pitch selector. The sound generator then generates a representative audio signal.

In a preferred embodiment, the input device is a joystick having a base, a movable handle, and one or more buttons. The buttons can be used by the user to tell the electronic music system "play" and to perform certain musical effects such as: sustain the current note; play a particular riff; repeat the lick just played; alter the timbre; bend the pitch; play a chord instead of a single note; add a dynamic accent; and/or add articulation. Moving the joystick's handle along the forward/backward axis can provide the rhythm-related input signals, and the right/left axis can be associated with the pitch-related input signals. For example, pulling the handle all the way backward can be an indication to the electronic music system to generate notes with the lowest rhythmic activity (e.g., whole notes), and pushing it all the way forward can mean generate the highest-activity notes (e.g., sixty-forth notes). When the handle is between these two extremes, rhythmic activity between the two extremes is generated. Also, moving the handle all the way to the right can correspond to the highest possible pitch, and the leftmost position can mean the lowest possible pitch, with a position therebetween meaning a pitch between the highest and lowest pitches. The user can manipulate the joystick handle and quickly and easily switch rhythms and pitches. These two simple movements alone (back and forth, and left and right) allow the user to create a solo with rich and varied rhythmic and tonal qualities.

In some embodiments, the electronic music system includes one or more speakers for broadcasting the audio signal from the sound generator. An amplifier generally must be used to amplify the audio signal before it is broadcast through the speaker(s).

Also, in a preferred embodiment of the electronic music system according to the invention, a programmed computer performs the functions of the rhythm generator and the pitch selector. The programmed computer can also perform the functions of the sound generator, or the sound generator can be a MIDI tone generator separate from the computer. The speaker(s) and/or the amplifier can be internal to the computer as well.

In general, in another aspect, the invention features an electronic rhythm generation system having an input device, a computer storage medium, and a rhythm generator. The input device generates rhythm-related input signals in response to manipulations of the input device by a user. The computer storage medium has a plurality of rhythm blocks wherein each rhythm block defines, for at least one note, at least a time at which the note should be played. The rhythm generator receives the rhythm-related input signals from the input device, selects one of the rhythm blocks from the computer storage medium based on the rhythm-related input signals, and outputs an instruction to play the note at the time defined by the selected rhythm block.

In still another aspect, the invention involves an electronic pitch selection system which comprises an input device, computer storage media, and a pitch selector. The input device generates pitch-related input signals in response to manipulations of the input device by a user. The computer storage media has a plurality of user-selectable musical accompaniment tracks, and stores at least the pitches selected by the system over a predetermined time interval in the immediate past. The pitch selector receives the pitch-related input signals from the input device, and then selects an appropriate pitch based on the pitch-related input signals, the user-selected musical accompaniment track, and the stored pitches. The pitch selector outputs that appropriate pitch.

In general, in yet another aspect, the invention involves an electronic system for processing data representative of a musical score to modify automatically the score by adding instrument-specific performance parameters or musical ornamentation.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIGS. 6A, 6B, 6C, and 6D each shows an example of the rhythm block data structure.

FIGS. 7A and 7B each shows an example of the rhythm style data structure.

DESCRIPTION

Figure 1:
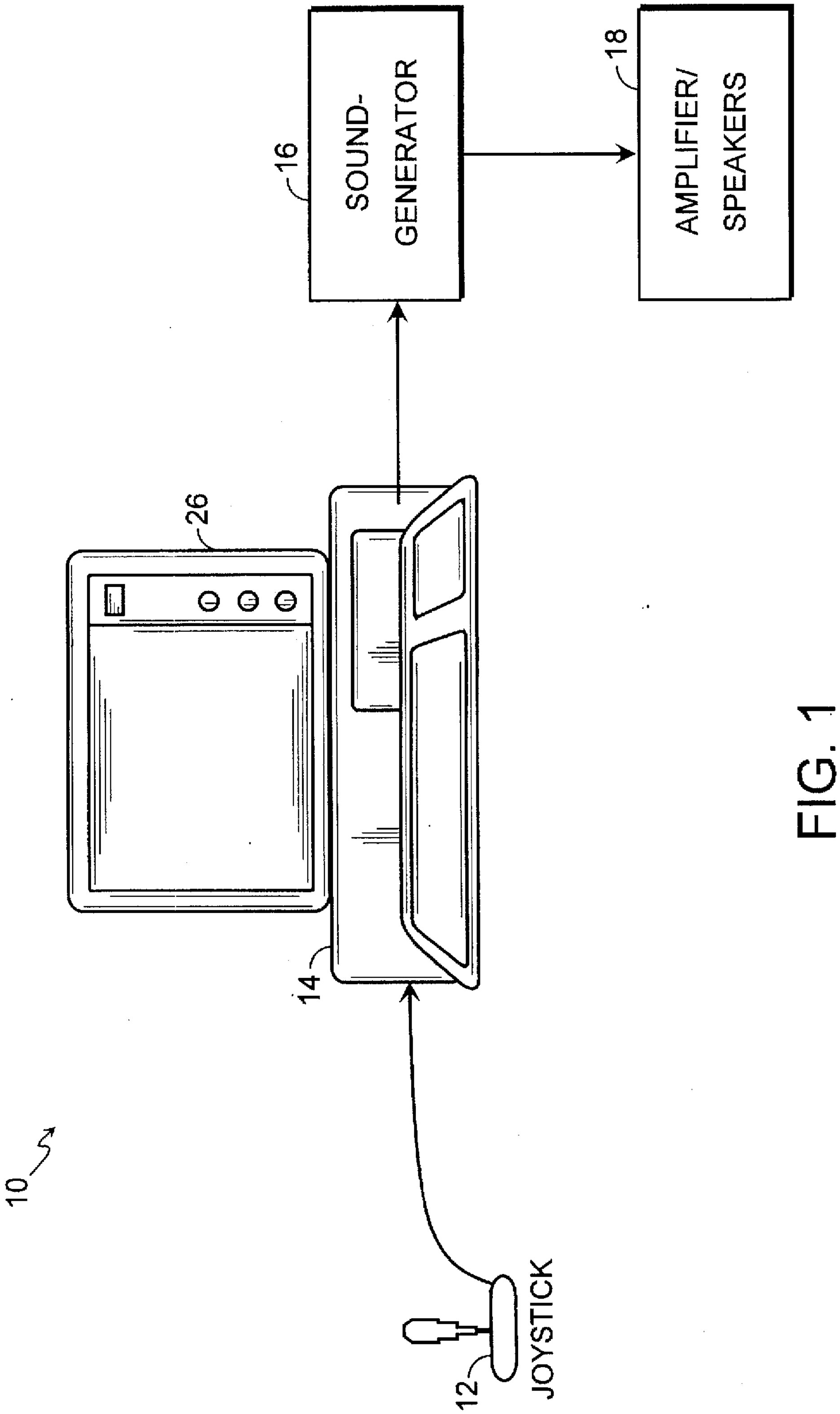
FIG. 1 is block diagram of a computer-assisted real-time music composition system which uses a simple controller in accordance with the invention.

Referring to FIG. 1, a system 10 according to the invention generates music in real-time in response to a user's manipulation of one or more simple controllers/input devices 12 such as a joystick. The system 10 includes a computing device 14, a sound generator 16, and one or more speakers 18. The computing device 14 typically is a personal-type computer running programs which generate in real-time digital data representative of music in response to the joystick 12 manipulations. The data is then turned into audible music by the combination of the sound generator 16 and the speaker(s) 18.

The system 10 is an electronic music system that is designed for non-musicians but which can be used by anyone that wants quickly and easily to generate melodic, creative music in real-time. The user is not required to have any knowledge of music theory or the ability to play an instrument or keep time. All the user needs to know how to do is to manipulate the joystick 12. Other equally simplistic input devices can be used in place of the joystick 12 to create music including, for example, a mouse, a game pad, a tracball, a MIDI keyboard, a MIDI guitar, other MIDI instruments, any of a variety of spatial sensors that can track hand/body motion through the air, one or more switches such as the up/down volume touch buttons on an electronic car radio, or any combination of such input devices. The user's manipulations of the input device (e.g., joystick 12) send actuator signals (e.g., changes in the positions of buttons or continuous controllers like the axes of a joystick's handle) which cause the system 10 to generate and play a non-pre-recorded melody over a user-selected pre-recorded accompaniment/background track.

All of the complexity associated with creating music from a traditional or known instrument has been incorporated into the system 10 of the invention. The system 10 relieves the user of the burden of having to learn to play a traditional or known instrument. The system 10 provides the user with a simple controller/input device (e.g., the joystick), and the user thus is free to concentrate solely on the music itself. The user does not have to worry about instrument-playing technique, being in tune, playing in time, etc. The system 10 of the invention has been designed to handle all of those concerns. Even though the system 10 uses a very simple-to-operate interface (e.g., the joystick 12) and the user need not have any special musical abilities or knowledge, the user generally is not limited in the type, style, or variety of music that he can produce with the system 10 of the invention. The system 10 allows a user to do essentially anything that can be done with any traditional or known instrument.

Referring still to FIG. 1, the function of the sound generator 16 is to generate signals representative of audible music, and this can be accomplished by, for example, synthesis or sample playback. The electronic hardware needed to generate these signals can reside on a card plugged into the computer 14, or it can be in a separate box external to the computer 14. Also, in the case of synthesis, the signal generation can be performed either in hardware or entirely by software running on the computer 14. The sound generator 16 can be, for example, a MIDI tone generator or other synthesis device. The signals generated by the sound generator 16 generally must be amplified and broadcast by the speakers 18. The amplification and broadcasting can be accomplished by, for example, hardware internal to the computer 14 or hardware external to the computer 14.

The computer 14 can be any personal-type computer or workstation such as a PC or PC-compatible machine, an Apple Macintosh, a Sun workstation, etc. The system 10 was developed using a Macintosh Powerbook 540c computer with 12 megabytes of RAM and the MAC/OS 7.5.1 operating system, and the computer programs for implementing the functionality described herein were written in the C++ programming language. In general, any computer could be used as long as it is fast enough to perform all of the functions and capabilities described herein without adversely affecting the quality of the generated music. The particular type of computer or workstation is not central to the invention. In fact, the music composition system according to the invention can be implemented in a variety of ways including an all-hardware embodiment in which dedicated electronic circuits are designed to perform all of the functionality which the programmed computer 14 can perform.

Figure 2:
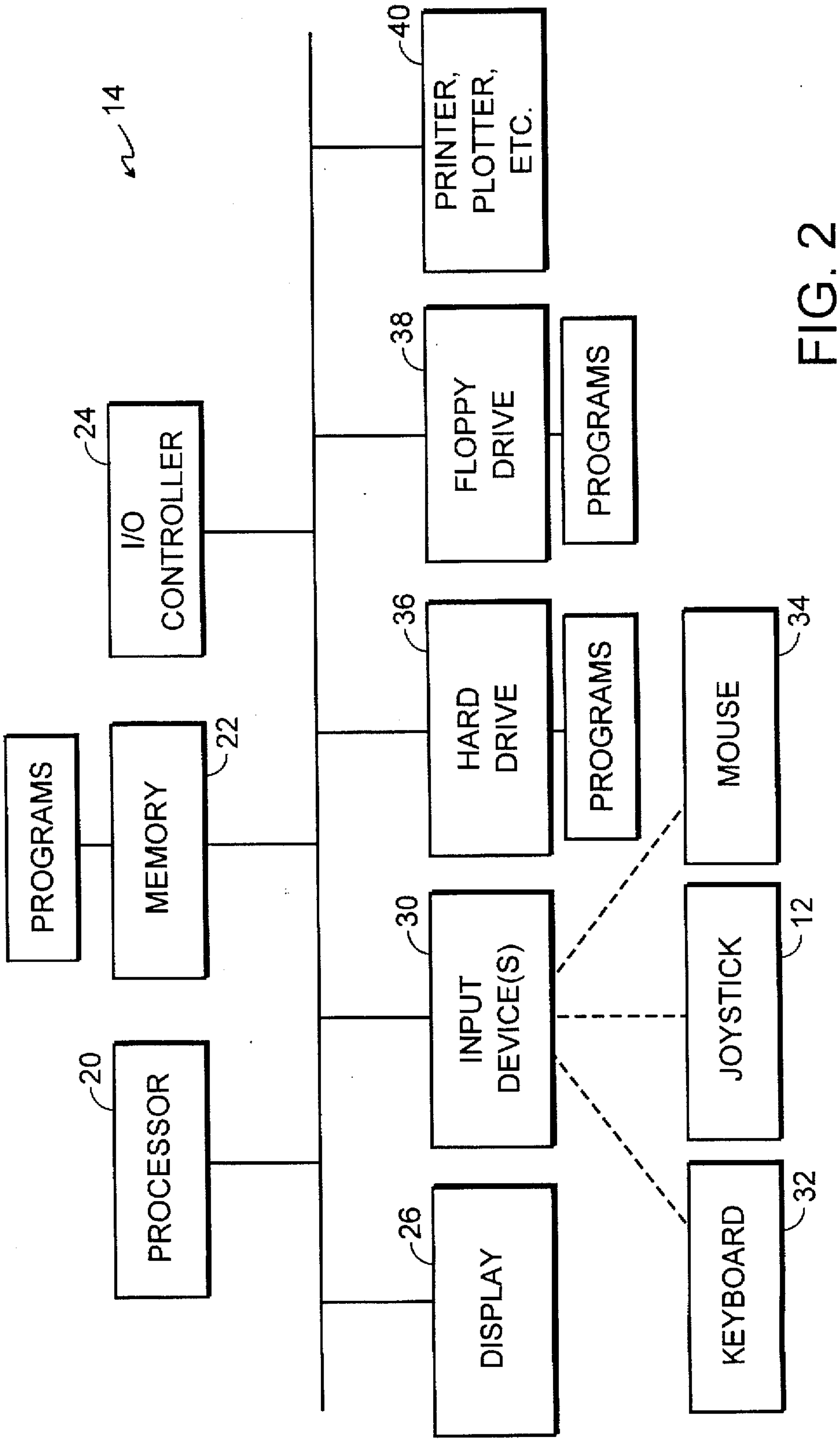
FIG. 2 is a simplified block diagram of a computer in which the present invention can be embodied.

Referring to FIG. 2, the computer 14 typically will include a central processor 20, a main memory unit 22 for storing programs and/or data, an input/output (I/O) controller 24, a display device 26, and a data bus 28 coupling these components to allow communication therebetween. The memory 22 includes random access memory (RAM) and read only memory (ROM) chips. The computer 14 typically also has one or more input devices 30 such as a keyboard 32 (e.g., an alphanumeric keyboard and/or a musical keyboard), a mouse 34, and the joystick 12. In a preferred embodiment, the system 10 includes the single joystick 12, the alphanumeric keyboard 32, and the mouse 34. In general, the joystick 12 is used by the user to create music with the system 10, and the alphanumeric keyboard 32 and mouse 34 are used by the user to setup and configure the system 10 prior to the actual creation of music with the system 10.

The computer 14 typically also has a hard drive 36 with hard disks therein and a floppy drive 38 for receiving floppy disks such as 3.5 inch disks. Other devices 40 also can be part of the computer 14 including output devices (e.g., printer or plotter) and/or optical disk drives for receiving and reading digital data on a CD-ROM. In the disclosed embodiment, one or more computer programs written in C++ define the operational capabilities of the system 10, as mentioned previously. These programs can be loaded onto the hard drive 36 and/or into the memory 22 of the computer 14 via the floppy drive 38. In the disclosed embodiment, the executable version of the C++ programs are on the hard drive 36, and the music composition system 10 according to the invention is caused to run by double-clicking the appropriate icon. In general, the controlling software program(s) and all of the data utilized by the program(s) are stored on one or more of the computer's storage mediums such as the hard drive 36, CD-ROM 40, etc. In general, the programs implement the invention on the computer 14, and the programs either contain or access the data needed to implement all of the functionality of the invention on the computer 14.

Figure 3A:
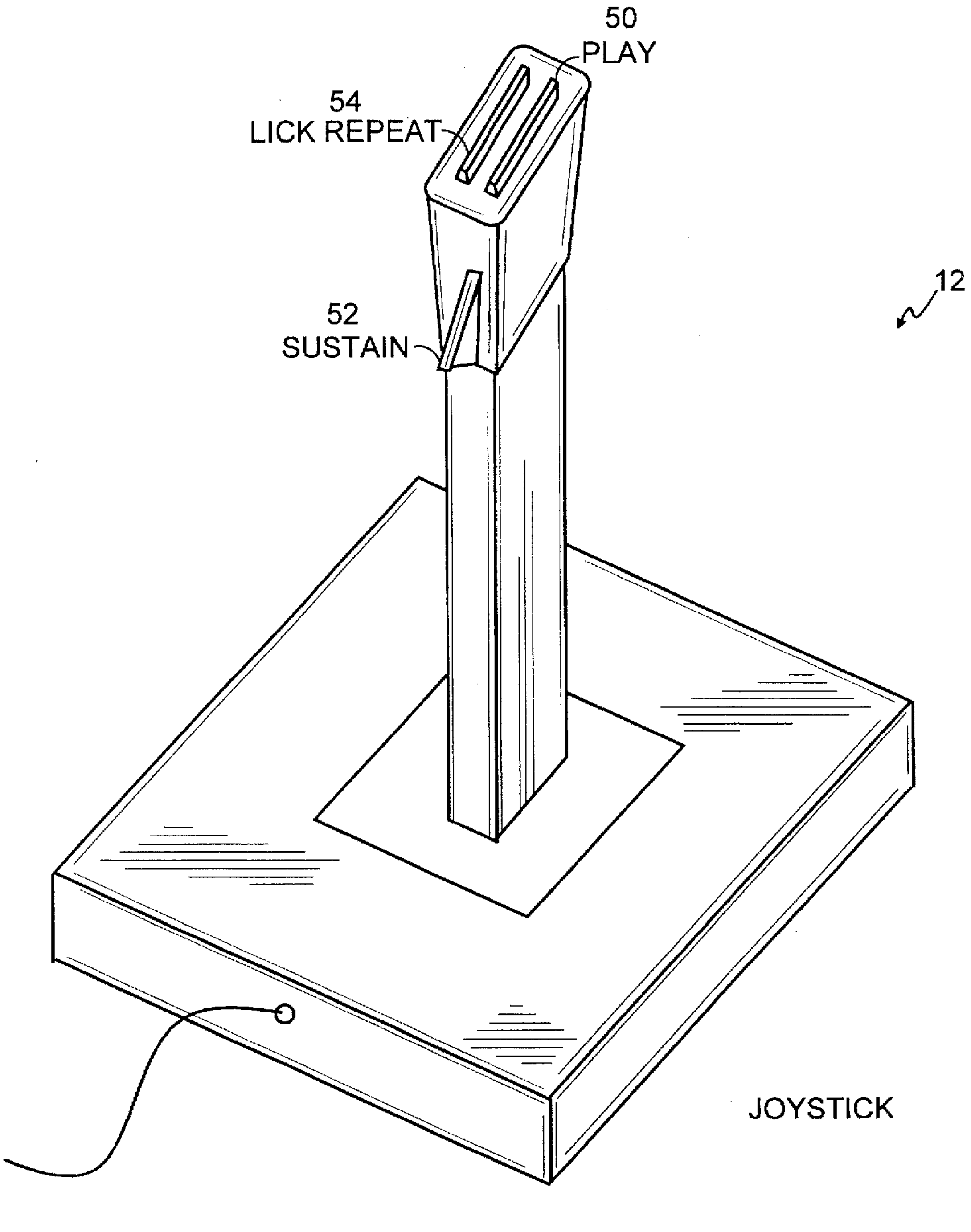
FIG. 3A is a perspective view of a computer joystick for use as an input device/controller of the system in accordance with the invention.
Figure 3B:
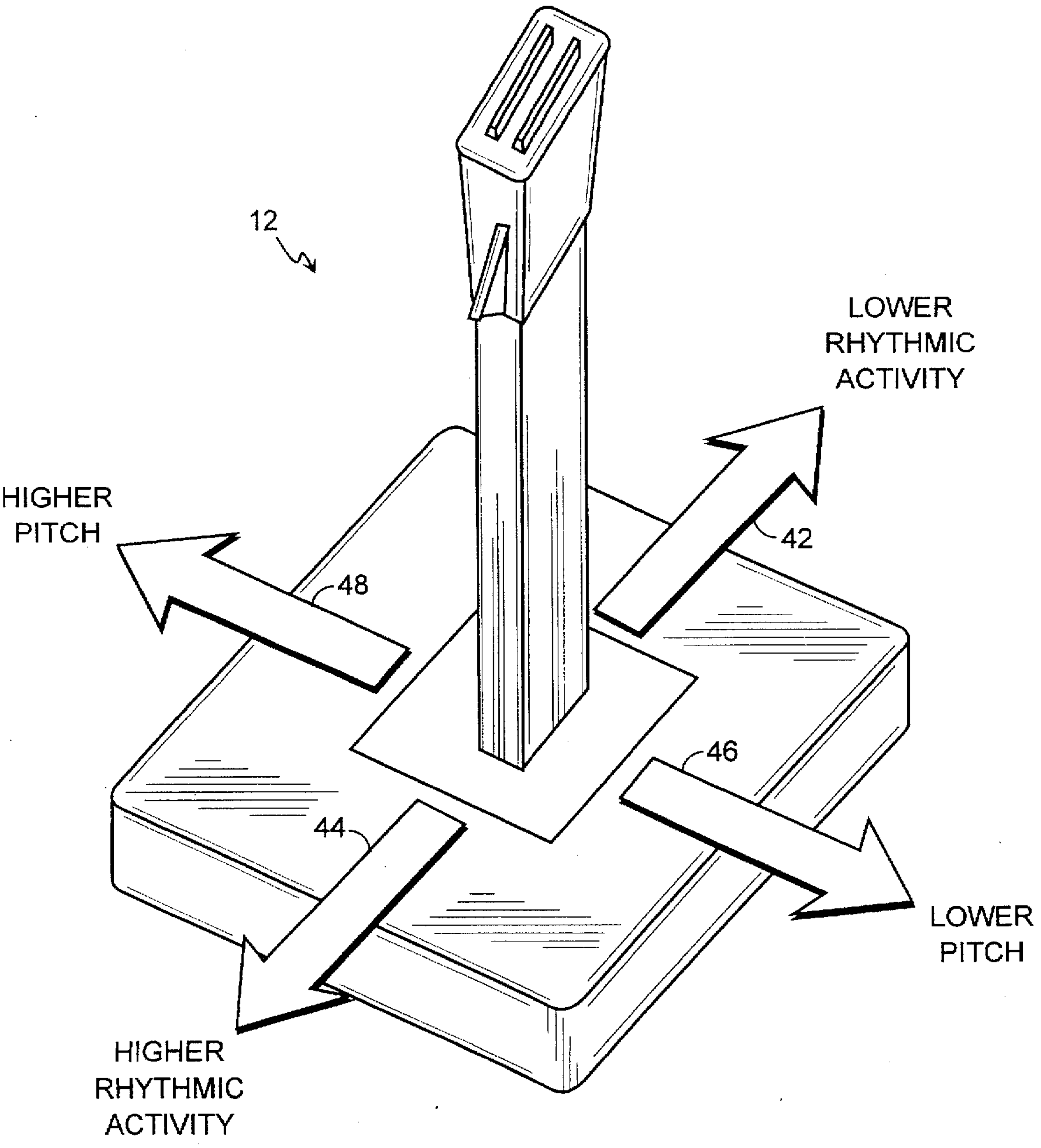
FIG. 3B is also a perspective view of the joystick showing the meaning of various movements in one embodiment of the invention.

Focusing back on some of the more central aspects of the invention, the input device/controller (e.g., the joystick 12) which a user of the system 10 manipulates to create music preferably allows the user to indicate to the computer 14 a variety of information. Referring to FIGS. 3A and 3B, in a preferred embodiment, this is accomplished by the joystick 12 being movable in at least four directions 42, 44, 46, 48 and having at least three buttons 50, 52, 54.

In the disclosed embodiment, pulling the handle of the joystick of FIG. 3B in the backward direction 42 indicates to the computer 14 that the user wants to play fewer notes over time (e.g., half notes as opposed to eighth notes) in the given time signature, and pushing it forward 44 is an indication to play more notes over time (e.g., thirty-second notes as opposed to quarter notes). The handle of the joystick 12 moves from its backwardmost position to its forwardmost position through a series of rhythmic values starting with notes having the lowest rhythmic activity (e.g., whole notes) at the backwardmost position and going all the way to notes having the highest rhythmic activity (e.g., sixty-forth notes) at the forwardmost position. The user generally can create any rhythmic output by moving the handle of the joystick back and forth. The selection of the end points of this series and the number and type of notes in between the two end points generally is made by the system designer/programmer. There are a large number of possible series or continuums, and the system usually selects one or more particular series automatically without any user involvement. The system typically will select one or more series of rhythm values based on the user-selected (or default) accompaniment and/or style of music. These rhythm continuums and the selection of them will become clear hereinafter from discussions about the "rhythm generator" aspect of the system 10 according to the invention.

Continuing with the current example, pushing the handle of the joystick to the left 46 indicates to the computer 14 that the user wants to play notes of a lower pitch (i.e., frequency or tone), and pushing it in the right direction 48 is an indication to play higher-pitched notes. As with the rhythmic values, the joystick 12 moves from its leftmost position to its rightmost position through a series of pitches starting with a lowest-pitched note at the leftmost position and going all the way to a highest-pitch note at the rightmost position. The user can produce virtually any combination of pitches by manipulating the handle side to side. The program running on the computer 14 generally determines the notes in the series, and the determination typically is based on the selected accompaniment and/or style of music.

Referring to FIG. 3A, in the disclosed embodiment, the joystick 12 has at least a play button 50, a sustain button 52, and a lick repeat button 54.

The play button 50 is used by the user to indicate to the computer 14 when to start creating and playing the melody under the user's joystick control. The user must depress and hold the play button 50. Depressing the play button 50 enables the "rhythm generator" (discussed hereinafter). As alluded to previously, in the disclosed embodiment, the output of the rhythm generator is determined by the forward/backward position of joystick 12 (FIG. 3B). The user is only allowed to create and play a melody after the accompaniment has been started, and the user preferably starts the accompaniment by using the mouse 34 and/or alphanumeric keyboard 32 to click on a graphic start button on the monitor 26 of the computer 14.

The sustain button 52 is used by the user to indicate to the computer 14 that the note currently playing (or the next note played) should be sustained or held such that it continues to sound. That is, the current note is maintained for an extended period of time. This is similar to a vocalist "holding a note". The note ends when the user releases the sustain button 52.

The lick repeat button 54, when depressed, causes the system 10 to repeat a particular collection of notes previously played. This button 54 is useful if the user has just created a particularly pleasing "lick" or "riff" (which generally is a catchy collection of several notes) and wants to repeat it automatically without having to figure out and re-enact exactly what she just did with the joystick 12 to create the lick in the first instance. The lick stops repeating when the user releases the lick repeat button 54. The point in history at which the system 10 demarcates the beginning of the lick is randomly or algorithmically determined by the computer program. The length of the repeated segment is typically a few beats or less, as described hereinafter under the "licker" section.

The discussion of this algorithm brings up the important point that the programmed computer 14 is a digital processing device which is capable of storing in digital format some or all of the data it generates and outputs to the sound generator 16 (FIG. 1). That is, it can, and does, store (e.g., on the hard drive 36, in memory 22, etc.) the data representative of the melody the user is creating as it is being created. This capability is what allows the user to repeat a lick with the lick repeat button 54. The computer 14 generally stores the last ten notes of the melody, although this parameter is configurable and can be set to store more or less notes.

Having described the environment in which the invention operates and generally the overall purpose and functionality of the music composition system 10 of the invention, the following is a more detailed description of the invention.

Figure 4A:
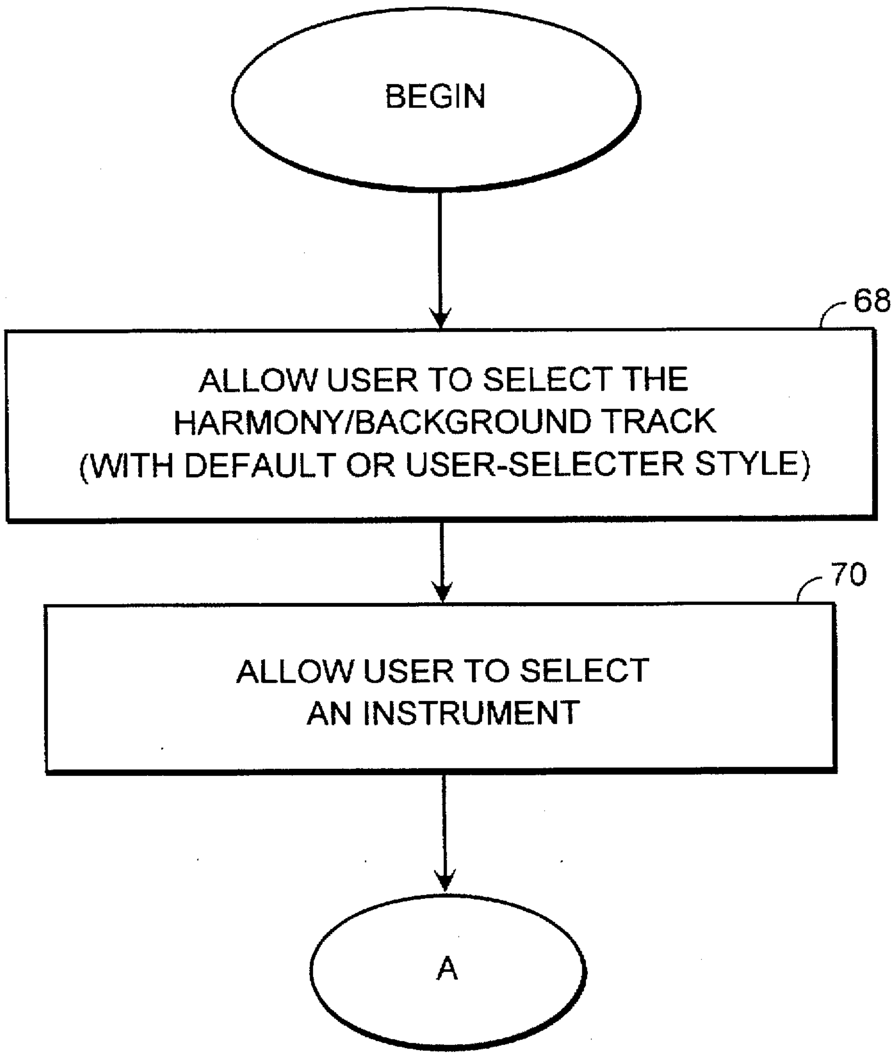
FIG. 4A is a simplified flowchart of a set-up procedure a user goes through before generating music with the system of the invention.

Setup:

Referring to FIGS. 1, 2, and 4A, the programmed computer 14 of the system 10 takes the user through a configuration or setup procedure before the user is allowed to create music with the system 10. In a preferred embodiment, the input devices 30 used by the user to configure or setup the system 10 are the keyboard 32 and/or the mouse 34. After the setup is complete, the user generally uses the joystick 12 (or other similarly simple-to-operate input device) to create music with the system 10. During the setup stage, the programmed computer 14 allows the user to select a particular background or accompaniment track (step 68) from a list of a plurality of possible tracks. In a preferred embodiment, the background tracks are stored either as MIDI files or as audio files. In general, MIDI files are small (i.e., do not take up a large amount of space on the storage medium such as the memory 22, the hard drive 36, or the CD-ROM 40) and audio files are comparatively large. If the tracks are MIDI, the selected track typically will be loaded into the memory 22 of the computer 14 from its hard drive 36 or CD-ROM 40, for example. If the tracks, however, are audio, the selected track typically will not be loaded into memory 22 and will instead be streamed off of, for example, the hard drive 36 or the CD-ROM 40 as needed during the user's performance.

After selection of the desired accompaniment, the user may select a particular style of music that he wishes to play, but the default is that the computer 14 chooses the style that has been pre-associated with each of the possible background tracks. Once the style is determined by either default or user selection, the computer 14 loads into memory 22 the data relevant to that style.

The user is then allowed by the computer 14 to select an instrument from a list of a plurality of possible instruments (step 70). In a preferred embodiment, the instrument list is stored by the computer 14 on, e.g., the hard drive 36 or the CD-ROM 40. For each instrument in the list, there are stored all kinds of data relevant to that instrument. These instrument-specific data are representative of, for example, the functionality of actuators (e.g., buttons) on the joystick 12 or other input device 30, whether the instrument can play chords and what voicings for the chords, the timbre of the instrument which is the characteristic quality of sounds made by the instrument independent of pitch and loudness, pitch envelopes for one or more notes that the instrument is capable of producing, and the pitch range for the instrument.

Figure 4B:
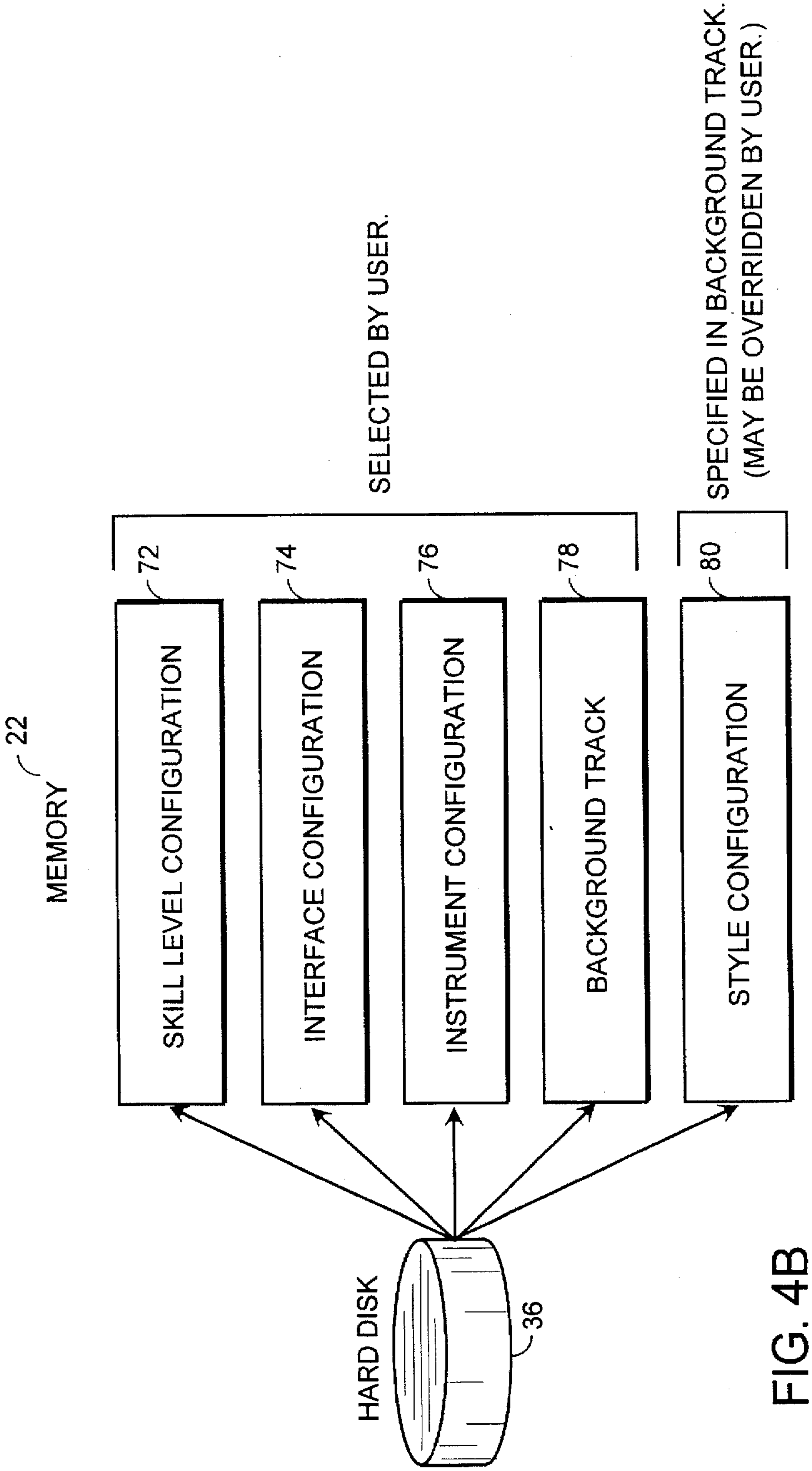
FIG. 4B is a more complete depiction of the set-up procedure.

A more complete description of the setup stage is provided below with reference to FIG. 4B. In FIG. 4B, the user-selectable items include the skill level 72 (novice through expert), the type of interface 74 (e.g., joystick, game pad, MIDI keyboard, spatial sensors, etc.), the type of instrument 76 (e.g., guitar, piano, saxophone, etc.), the background track 78 (i.e., the accompaniment piece over which the user wishes to play), and a musical style 80 in which the user wishes to play. Each background track has associated with it a default musical style that is most compatible with the accompaniment, but the user may choose an alternative style for the sake of experimentation. Once the user makes a selection from the plurality of choices available for each of these user-selectable items (e.g., novice, expert, or somewhere in between for the skill level 72 item), a whole set of data/variables associated with that selection for that item are loaded into memory 22 from the hard drive 36, and those data/variables are used to configure the system 10 in a particular way, as described hereinafter with reference to FIG. 4C.

Referring now to FIGS. 1, 2, 3A, 3B, and 5, with the setup stage complete, the programmed computer 14 waits until the user presses a "start" button (e.g., a graphic button on the monitor 26 which the user points to with the mouse 34 and clicks on). See step 82 in FIG. 5. Once "start" has been indicated, the playback of the background track commences (step 84). In the preferred embodiment, the user then uses the joystick 12 (or other similarly simple-to-operate input device) to create music with the system 10. As described previously with reference to FIG. 3A, the user must depress and hold the play button 50 on the joystick 12 (step 86) to enable the "rhythm generator" (discussed hereinafter) and thus the system 10 (step 88).

Figure 4C:
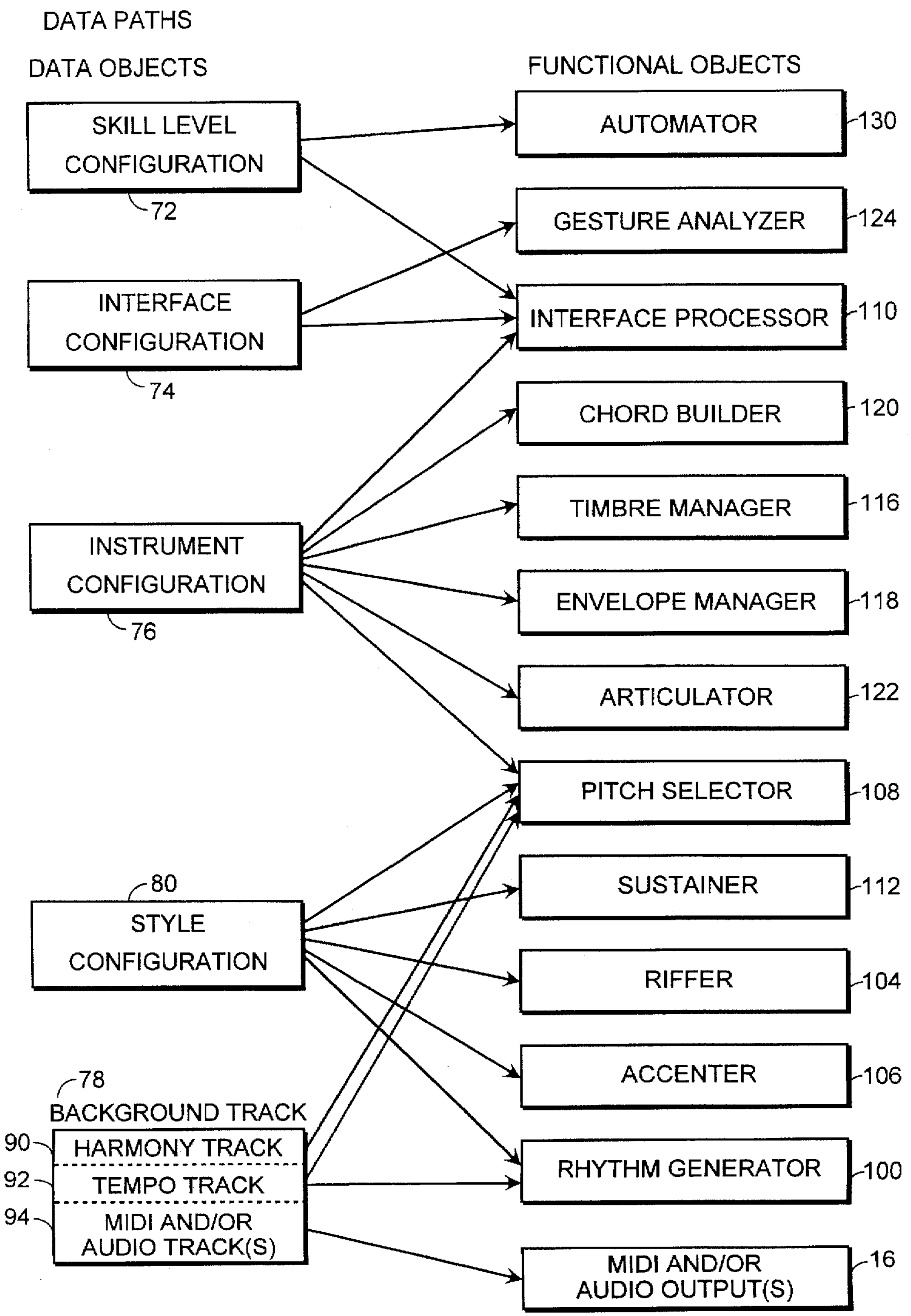
FIG. 4C is a data path diagram showing which functional blocks of the system according to the invention use what data/variables.

The following is a further description of the user-selected (or default) configuration data/variables (FIG. 4B), and the way that they affect the operation of the system 10 according to the invention. Referring to FIG. 4C, the configuration data associated with the selected skill level 72, interface type 74, instrument type 76, and musical style 80 are provided to one or more of the functional blocks of the system 10 of the invention as depicted. These functional blocks are all described hereinafter with reference to FIG. 10. The selected background track 78 also is provided to some of the functional blocks.

Still referring to FIG. 4C, some of the configuration data for the selected skill level 72 is provided to an automator functional block, and some is provided to an interface processor functional block. Both of those blocks are described hereinafter with reference to FIG. 10. The automator receives data about how much system automation should be turned on. For a novice, full-automation will be turned on such that the novice user need only operate the play button to create music, for example. For each level higher than novice, the level of system automation decreases to the point where an expert is given the most amount of control possible. For an expert, the system might enable all buttons and axes on the joystick and a plurality of additional buttons. These additional buttons typically are keys of the alphanumeric computer keyboard (or a MIDI keyboard or similar device). The interface processor is told what buttons, sliders, etc. on the interface (e.g., joystick and/or keyboard) are enabled/disabled.

Some of the configuration data for the selected interface type 74 is provided to a gesture analyzer functional block, and some is provided to the interface processor. Both of those blocks are described hereinafter with reference to FIG. 10. The gesture analyzer can be a joystick-sensing system or possibly an electronic eye system, and the data it receives indicates the user's gestures or movements (with the joystick) for which the gesture analyzer should be looking and also the corresponding system functions that should be triggered as a result of those gestures. The interface processor is told what non-instrument-specific system functions should be triggered by each of the various enabled actuators (e.g., buttons) on the interface (e.g., joystick).

Some of the configuration data for the selected instrument type 76 is provided to the interface processor, and other data is provided to a chord builder, a timbre manager, an envelope manager, an articulator, and a pitch selector. All of these functional blocks are described hereinafter with reference to FIG. 10. The interface processor is told what instrument-specific system functions should be triggered by each of the various enabled actuators (e.g., buttons) on the joystick. The chord builder is told whether or not the selected instrument can play chords and if so what are the characteristic chord structures or voicings for the selected instrument. The timbre manager is provided with the timbre information for the selected instrument. The envelope manager is told the pitch envelopes to be used for the selected instrument in order to shape the pitch of the note (e.g., bend it up or down) to simulate how that instrument would sound if played by a trained musician. The articulator is told whether slurring the chosen instrument will affect the attack portion of the timbre for that instrument. The pitch selector is provided with information about the range of pitches (lowest to highest) that the selected instrument could produce if played by a trained musician.

Some of the configuration data for the default (or selected) musical style 80 is provided to the pitch selector, and the other data is provided to a sustainer, a riffer, an accenter, and the rhythm generator. These functional blocks are described hereinafter with reference to FIG. 10. The pitch selector is provided with information about various melodic constraints for the given style such as at which times (metrically) consonant notes are more likely. The sustainer is told which times (metrically) are eligible for sustaining notes in the given style. The riffer is provided with "riffs" (which generally are rhythm blocks coupled with melodic contours) appropriate for the given style, and these are used for effects such as grace notes, gliassandi, trills, tremolos, and other melodic ornaments. The accenter and the rhythm generator are both provided with rhythm blocks associated with the given style.

As somewhat of an aside, it is noted that each of the background tracks from which the user can select comprises: (i) a harmony track 90; (ii) a tempo track 92; and (iii) a MIDI and/or audio track 94. The third component of the background track typically is either a MIDI track or an audio track. In either case, it is a data file of the music over which the user wants to play a solo or melody. It could be a song by, for example, James Brown, Black Sabbath, or Barry Manilow. The other two tracks, the harmony and tempo tracks, are created from scratch by the system programmers/designers based on the song (i.e., the MIDI/audio track). Unlike the MIDI/audio track, the harmony and tempo tracks are not recordings of a song that a person could listen to and recognize. Instead, these two tracks contain data that the system 10 of the invention utilizes in selecting and playing notes (under the user's control) that are appropriate for the song. The harmony track contains key and chord information about the song. More specifically, it contains data representative of the key and chord at any particular point in the song. The tempo track contains data representative of the timing of the song. It essentially provides timing information about the song in the form of a time grid.

The harmony track provides to the pitch selector the current "key" and the current "chord". The "key" data provided to the pitch selector includes both the root note of the key and the type of key. Examples are: "F major" (where "F" is the root and "major" is the type) which is defined by the notes F, G, A, B-flat, C, D, and E; "D minor" (where "D" is the root and "minor" is the type) which is defined by the notes D, E, F, G, A, B-flat, and C; and "C major" which includes the notes C, D, E, F, G, A, and B.

The tempo track provides to the pitch selector the aforementioned time grid which the pitch selector uses to select a pitch from one of two or more classes of pitches. The pitch selector makes this selection between or among classes based, in part, on the current metric position. For instance, the two classes might be chord tones (i.e., notes in the current chord) and passing tones (i.e., notes in the current key or scale). For example, it is a general melodic principle that chord tones should normally be played on the beat (e.g., the down beat or other strong beats) and passing tones should normally be played off the beat or on weak beats. Given the current metric position with respect to the beat or measure, the pitch selector will select the most appropriate pitch class. Then, a particular pitch from that class is selected by the pitch selector based on the current harmony and the current pitch-related joystick position. An example is when the current chord is a C chord and the current key is "D minor" in which case a G note might be played on a strong beat and a B-flat note might be played off the beat or on a weak beat. It is noted that some notes may, and very often will, overlap between or among the plurality of classes such as in the previous example where the current chord is C (i.e., the chord tones are C, E, and G) and the key is "D minor" (i.e., the passing tones are D, E, F, G, A, B-flat, and C).

The tempo track also provides data to the rhythm generator. The rhythm generator gets the aforementioned time grid which the rhythm generator uses to synchronize the user-created melody or solo line with the background track.

Figure 5:
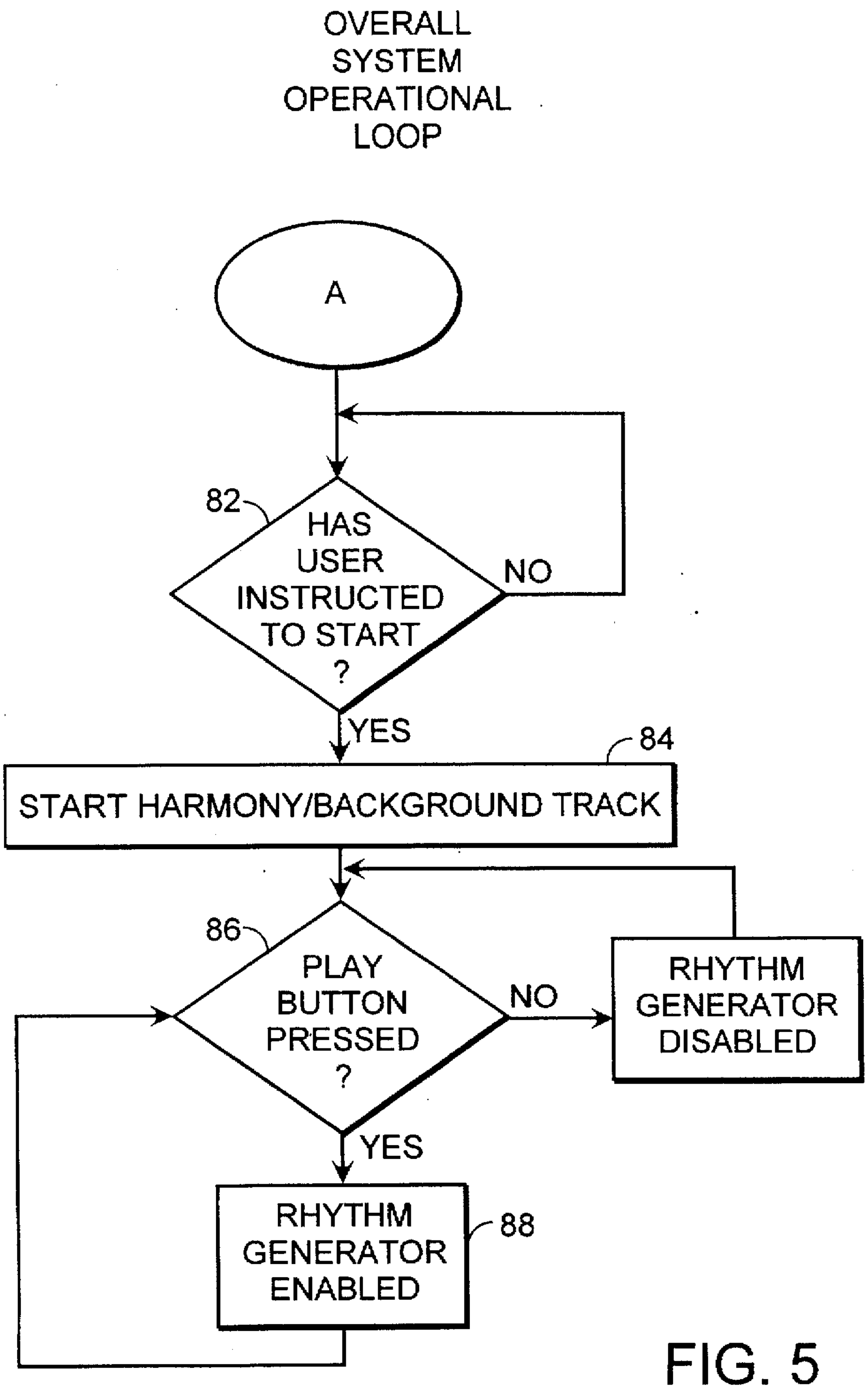
FIG. 5 is a high-level flowchart of the operations performed by the system of the invention after set-up is complete.

Rhythm Blocks:

The "rhythm blocks" alluded to above are now described in detail. Rhythm blocks are fundamental to the operation of the invention. Rhythm blocks are utilized by the "rhythm generator" (described hereinafter) to produce rhythmic signals when, for example, the user depresses the play button 50 on the joystick (FIGS. 3A and 5). As alluded to above with reference to FIG. 3B, rhythm blocks are organized by the system designer/programmer into a plurality of groupings where each grouping ranges from a block with a lowest rhythmic activity for that group to a block with a highest rhythmic activity for that group. Once the musical style is selected (by the user or by default), the associated group or list of rhythm blocks are copied into the memory 22 of the computer 14 from, for example, the hard drive 36. A given style of music might cause a set of rhythm blocks to be copied into memory that range from a whole note at the lowest activity level block to a sixty-forth note at the highest activity level block. In such a case, and if the joystick of FIG. 3B is used as the interface, pulling the handle of the joystick 12 all the way backward and holding it there would result in a series of whole notes to be output by the rhythm generator and played by the system, holding the handle all the way forward would cause a series of sixty-forth notes to be output, and moving the handle to a position somewhere therebetween would result in the output of a series of notes having a rhythmic activity level somewhere between whole notes and sixty-forth notes such as eighth notes. Also, and perhaps more importantly, as the user moves the handle back and forth, the rhythmic output is varied accordingly and the user is thus able to, for example, follow a half note with a sixteenth note, and the user generally is able to create a rhythmic output of any variety or combination.

A rhythm block can be thought of as a data structure that has five fields: (i) identifier (a name and an identification number); (ii) length; (iii) event list; (iv) dynamics list; and (v) durations list. A rhythm block does not need to have a value in each of these five fields, but every rhythm block typically will have at least an identifier, a length, and an event list. In the current embodiment, all five fields are used. The name component of the identifier indicates the type of note(s) in the rhythm block. The length of a rhythm block typically is one beat, but in general the length can be more than one beat such as 1.5 beats or two beats. The system designer/programmer has set one beat to equal 480 "ticks" of a scheduler. The preferred scheduler is OMS 2.0 which is available from Opcode Systems of Palo Alto, Calif., although another scheduler could be used such as Apple's QuickTime product. The event list specifies the precise times (in units of ticks) within a beat when the rhythm is to play. In the disclosed embodiment, the dynamics (i.e., volume, loudness, accent—which is called "velocity" in MIDI terminology) are measured or specified on a scale from 0 to 127 where 0 is silent and 127 is maximum velocity. The dynamics list specifies the loudness of each of the notes in the rhythm block. The duration list of the rhythm block sets how long the note(s) should last in units of ticks.

Referring to FIG. 6A, one possible rhythm block defines two eighth notes. The block has a length of one beat and an event list with the values 0 and 240 which means that the first eighth note will sound at the beginning of the beat and the second one will sound at exactly half way through the beat (240/480=½). The dynamics list has values of 84 and 84, implying mezzo forte loudness for each note. The durations list has values of 240 and 240, implying legato articulation for each eighth note. In other words, the first eighth note will last until the second one plays (i.e., for ticks 0 through 239), and the second eighth note will last until the end of the beat (i.e., for ticks 240 to 479). The repeat notation in the "musical equivalent" section of this example indicates that the rhythm generator will continue to output this same rhythm block unless the user moves the position of the handle of the joystick 12. The same is true for all rhythm blocks; once the user has depressed the play button 50 on the joystick, the only way the rhythm generator will stop outputting the appropriate rhythm blocks is if the play button 50 is released.

Referring to FIG. 6B, another example of a rhythm block is two syncopated 16th notes. This block has a length of one beat, and an event list with the values 120 and 360 which means that the first sixteenth note will sound one-quarter of the way through the beat (120/480=¼) and the second sixteenth note will play at three-quarters of the way through the beat (360/480=¾). The dynamics are as in the previous example. The durations list has values of 120 and 120, implying detached articulation.

Referring to FIG. 6C, a third example of a rhythm block is a dotted eighth note cross-rhythm. In this example, the length is not one beat but instead 1.5 beats (i.e., 720 ticks). The event list has the value zero which means that the dotted eighth note will play at the beginning of the block. The dynamics and duration are as indicated in the figure.

Referring to FIG. 6D, the final example shows two eighth notes with an offbeat accent. The length is one beat or 480 ticks, and the event list values of 0 and 240 will cause the first eighth note to play at the beginning of the beat and the second one to play in the middle of the beat, as in FIG. 6A. The dynamic values of 72 and 96 will cause the second note to sound accented. The duration values of 120 and 240 will further distinguish the two notes.

Once the system designer/programmer has defined all desired rhythm blocks, he assembles a plurality of groups or lists using the rhythm blocks as the items in the list. As described previously, each grouping contains two or more rhythm blocks organized in order of increasing rhythmic activity. The rhythm blocks and the groupings of them are essentially transparent to the user. The musical style that is selected by the user or by default (FIGS. 4A–4C) determines the group(s) of rhythm blocks that will be available to the user.

Referring to FIG. 7A, one example of a style and its associated rhythm block data is the slow rock musical style. Associated with this style are four separate groupings of rhythm blocks, each one having its rhythm blocks ordered in increasing rhythmic activity. The four groupings of rhythm blocks are titled "Normal", "Syncopated", "Alternate 1", and "Alternate 2". A user can be allowed to switch among these four groups by, for example, operating a button on his joystick. Like the example in FIG. 3B, in this example, with the handle of the joystick in the leftmost position, the rhythm block at the top of the appropriate list is selected, and with the handle in the rightmost position, the rhythm block at the bottom of the appropriate list is selected. This example of a musical style shows other data or variables that can be determined by the style configuration 80 (FIGS. 4B and 4C), and these are "swing" and "half-shuffle" parameters. In the slow rock style example, the swing is set to 0% and the half-shuffle also is set to 0%. Swing and half-shuffle are defined below.

The "swing" parameter is a measure of how much the offbeat (or upbeat) eighth note should be delayed. The delay range is 0 to 80 ticks where 0% corresponds to 0 ticks and 100% corresponds to 80 ticks. Thus, a swing of 50% means to delay the offbeat eighth notes by 40 ticks. Swing is a well-known term used by musicians and composers to indicate the offbeat eighth note delay described above.

The "half-shuffle" parameter is a measure of how much the upbeat sixteenth notes (occurring at ticks 120 and 360 within the beat) should be delayed. The delay range is 0 to 40 ticks where 0% corresponds to 0 ticks and 100% corresponds to 40 ticks. Thus, a half-shuffle of 50% means to delay the offbeat sixteenth notes by 20 ticks. Half-shuffle is a well-known term used by musicians and composers to indicate the upbeat sixteenth note delay described above.

Referring to FIG. 7B, another example of a style and its associated rhythm block data is the fast blues musical style. Associated with this style are three separate groupings of rhythm blocks, each one having its rhythm blocks ordered in increasing rhythmic activity. The three groupings of rhythm blocks are titled "Normal+Syncopated", "Alternate 1", and "Alternate 2". A user can be allowed to switch among these three groups by, for example, operating a button on his joystick. Like the style example in FIG. 7A, in this example, with the handle of the joystick in the leftmost position, the rhythm block at the top of one of the three lists is selected, and with the handle in the rightmost position, the rhythm block at the bottom is selected. The swing parameter for this example style is set to 50% which means that all offbeat eighth notes will be delayed by 40 ticks. As with the previous style example, the half-shuffle parameter is set to 0% which means no delay of the offbeat sixteenth notes.

Rhythm Generator:

The "rhythm generator" that outputs the above-described rhythm blocks is now described in detail. The rhythm generator allows the user to produce "musically correct" rhythms without requiring the user to have the physical dexterity needed to play those rhythms on a traditional or known instrument. The user can enable and disable the rhythm generator with the play button on the joystick. This button causes the music to start and stop, and thus it can be used by the user to simulate the way an improvising musician starts and stops musical phrases during a solo. The user can use a combination of buttons and continuous controllers (e.g., the axes of a joystick handle, faders, sliders, etc.) on his interface to control the activity and complexity of the generated rhythms.

Figure 8:
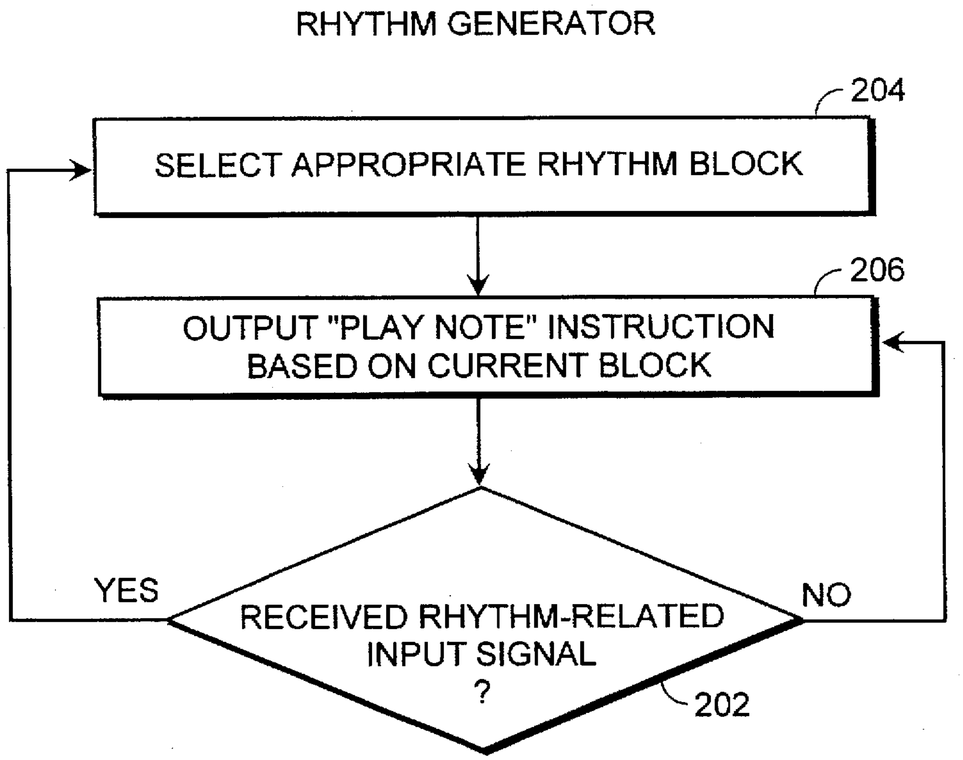
FIG. 8 is a high-level flowchart of the steps performed by the rhythm generator functional block of the system of the invention.
Figure 10:
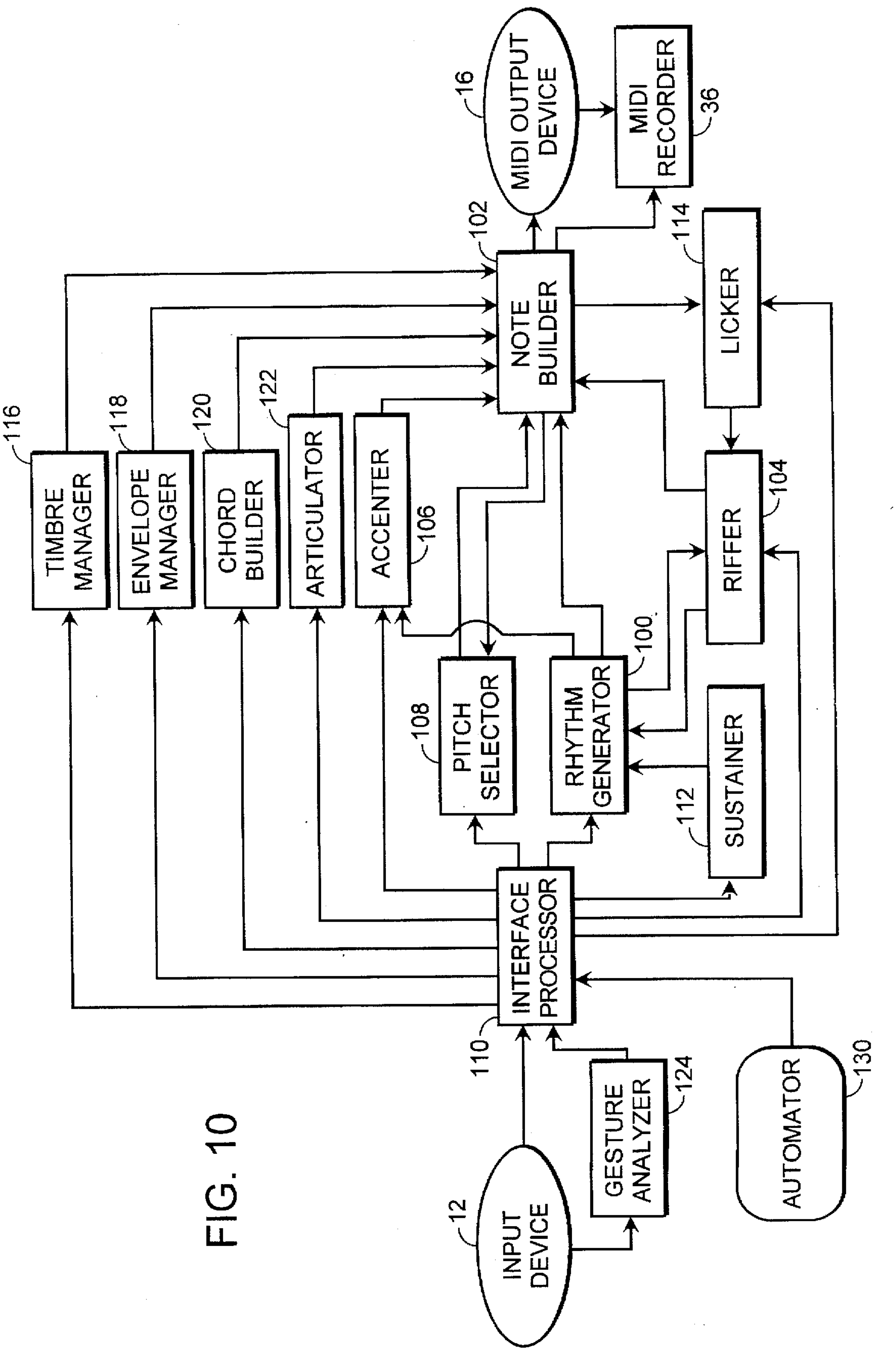
FIG. 10 is a detailed functional block diagram of the computer-implemented system according to the invention.

Referring to FIGS. 8 and 10, the rhythm generator 100 selects a rhythm block (from the group of rhythm blocks provided by the style configuration 80, FIGS. 4B and 4C) in response to every rhythm-related input signal from the joystick or other similarly simple-to-operate interface 12 (steps 202 and 204). Once the rhythm generator 100 selects a rhythm block, it transmits messages to a note builder functional block 102, the riffer 104, and the accenter 106.

To the note builder 102, the rhythm generator 100 sends a "play note" instruction at the correct times as defined by the rhythm block itself (step 206). A "play note" instruction includes all of the information defined by the rhythm block, specifically the name of the block, its length, and its event list as well as either specified or default dynamics and duration information.

If the rhythmic activity is sufficiently high, it can be difficult or impossible for the user to manipulate the input device (e.g., joystick) fast enough to avoid rapid repetition of the same pitch. To remedy this situation, when the rhythmic activity gets sufficiently high, the rhythm generator 100 sends an instruction to enable the riffer 104. Once enabled, the riffer 104 disables the rhythm generator 100, and the riffer 104 then automatically outputs pre-stored melodic elaborations (e.g., arpeggios). When the rhythmic activity becomes sufficiently low again, the riffer 104 will return control to the rhythm generator 100. The riffer 104 is described in more detail hereinafter under the "riffer" heading.

The information transmitted by the rhythm generator 100 to the accenter 106 is the identification number for the current rhythm block. The accenter 106 uses that ID number to add accent patterns, as described hereinafter under the accenter heading.

Figure 9:
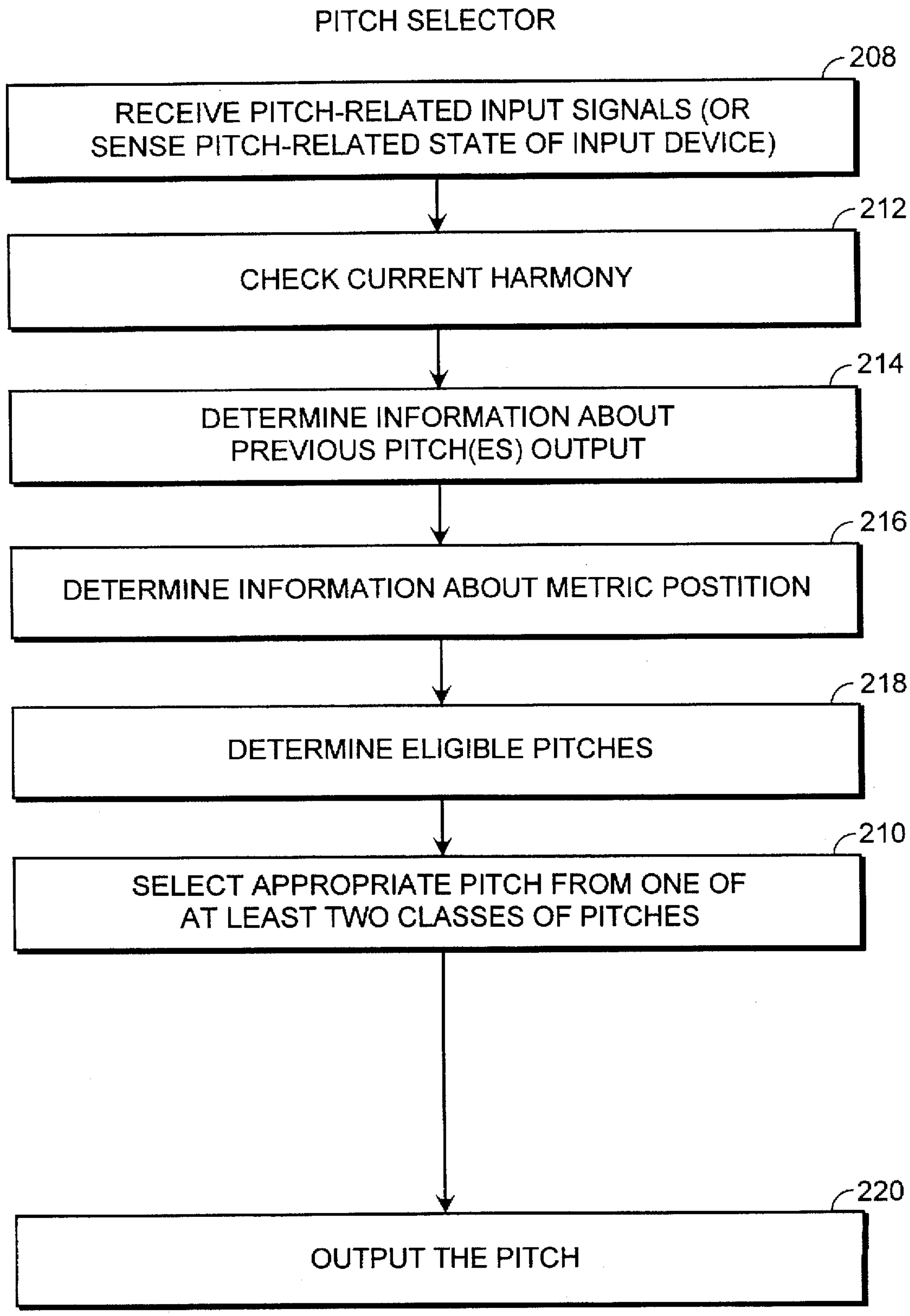
FIG. 9 is a high-level flowchart of the steps performed by the pitch selector functional block of the system of the invention.

Pitch Selector:

Referring to FIGS. 9 and 10, the "pitch selector" 108 ensures that the pitches of the notes generated by the user are "musically correct". In response to every pitch-related input signal from the joystick or other similarly simple-to-operate interface 12, the pitch selector 108 selects a pitch for playback (steps 208 and 210). The pitch selector selects an appropriate pitch as a function of the pitch-related input signals from the joystick, the current key and chord of the accompaniment (provided by the harmony track 90 part of the background track 78, FIG. 4C), the current metric position (provided by the tempo track 92 part of the background track 78), and information about previous pitches played. See steps 218, 210, 208, 212, 216, and 214 of FIG. 9. Note that the metric position is an indication of the current position in, for example, a beat (e.g., on the beat or off the beat) or a measure (e.g., strong beat or weak beat), and it generally is independent of the harmony associated with that same point in time. Once a pitch has been selected, the pitch selector sends the selected pitch to the note builder 102 to be used in the next note that is played (step 220).

As described previously, the pitch selector 108 selects an appropriate pitch from one of a plurality of classes of pitches. The pitch selector 108 makes this selection between or among classes based on the factors disclosed in the preceding paragraph. As an example, there might be two classes where one is a collection of chord tones (i.e., notes in the current chord), another is a collection of passing tones (i.e., notes in the current key or scale), and another is a collection of chromatic tones.

For example, a general melodic principle is that chord tones should normally be played on the beat (e.g., the down beat or other strong beats) and passing tones should normally be played off the beat or on weak beats. Given the current metric position with respect to the beat or measure, the pitch selector will select the most appropriate pitch class. Then, a particular pitch from that class is selected by the pitch selector based on the current harmony and the current pitch-related joystick position. An example is when the current chord is a C chord and the current key is "D minor" in which case a G note might be played on a strong beat and a B-flat note might be played off the beat or on a weak beat. It is noted that some notes may, and very often will, overlap between or among the plurality of classes such as in the previous example where the current chord is C (i.e., the chord tones are C, E, and G) and the key is "D minor" (i.e., the passing tones are D, E, F, G, A, B-flat, and C).

When selecting a pitch class, the pitch selector also utilizes historical information about the melody. The pitch selector utilizes information such as the pitch classes of the preceding notes, the actual pitches of the preceding notes, and other melodic features of the preceding notes such as melodic direction. For example, a general melodic principle is that if a melody leaps to a non-chord tone, the melody should then step in the opposite direction to the nearest chord tone.

Once pitch class is determined by the pitch selector 108, the pitch selector 108 then utilizes the pitch-related input signals to select a particular pitch from within that class. In general, the pitch-related input signal corresponds directly to either: (i) pitch register (i.e., how high or low the pitch of the note should be); or (ii) change in pitch register (i.e., whether the next pitch should be higher or lower than the preceding pitch and by how much).

Interface Processor:

Referring to FIG. 10, the "interface processor" functional block 110 is responsible for channeling or "mapping" the signals from the input device 12 (e.g., joystick) to the correct system functional blocks. There are many ways that the interface processor 110 could have been configured. In the disclosed embodiment, the interface processor 110 is configured to transmit messages to the rhythm generator 100, the pitch selector 108, the sustainer 112, the riffer 104, a licker 114, the timbre manager 116, the envelope manager 118, the chord builder 120, an articulator 122, and the accenter 106.

To the rhythm generator 100, the interface processor 110 sends the position of the play button 50 on the joystick 12 which enables/disables the rhythm generator 100. Also sent is the position of the joystick handle along the forward/back axis, or whatever axis is used to increase/decrease rhythmic activity. The interface processor 110 also sends to the rhythm generator 100 the position of the other buttons on the joystick which can be used to change rhythm blocks for rhythmic special effects such as cross-rhythms, polyrhythms, and syncopation.

To the pitch selector 108, the interface processor 110 sends the position of the joystick's handle along the left-right axis, or whatever axis is used to raise/lower the pitch of the notes.

To the sustainer 112, the interface processor 110 sends the position of the sustain button 52 on the joystick 12 which enables/disables the sustainer 112.

To the riffer 104, the interface processor 110 sends the position of the various riff buttons which enable/disable the riffer's functions, and it sends information about the release of the sustain button 52 and the simultaneous position of the joystick handle along the left-right axis to trigger the riffer 104.

To the licker 114, the interface processor 110 sends the position of the lick repeat button 54 which enables/disables the licker 114, and it sends information about when the lick repeat button 54 is held depressed and the coincident position of the joystick handle along the left/right axis to move the lick up and down in register on each repeat.

To the timbre manager 116, the interface processor 110 sends the position of the various timbre buttons which enable/disable various functions of the timbre manager 116, and it sends information about when the sustain button 52 is held depressed and the coincident position of the joystick handle along the forward/backward axis to control continuous blending of multiple timbres.

To the envelope manager 118, the interface processor 110 sends the position of the various envelope buttons which enable/disable various functions of the envelope manager 118, and it sends information about when the sustain button 52 is held depressed and the coincident position of the joystick handle along the left/right axis to control pitch bending.

To the chord builder 120, the interface processor 110 sends the position of various chord buttons which enable/disable various functions of the chord builder 120.

To the articulator 122, the interface processor 110 sends the position of various articulation buttons which enable/disable various functions of the articulator 122.

To the accenter 106, the interface processor 110 sends the position of various accenter buttons which enable/disable various functions of the accenter 106.

The input device 12 typically will not include all of these buttons, although it may. FIGS. 3A and 3B show only three buttons, but there can be a variety of other buttons provided on, for example, the base of the joystick (or they can be the keys of the computer keyboard or the keys of a MIDI keyboard).

Gesture Analyzer:

Referring to still FIG. 10, instead of allowing the user only to provide input to the system by pressing a button or moving a continuous controller on the input device 12 (e.g., joystick), the gesture analyzer 124 can be used to allow the user to trigger specific system functions with "gestures". For example, the system can be configured to recognize "wiggling the joystick wildly" as a trigger for some special rhythmic effect. The gesture analyzer 124 is responsible for analyzing the user's manipulation of the interface and determining whether or not the user is, for example, currently "wiggling the joystick wildly" which would mean the gesture analyzer 124 should send the appropriate signal to the interface processor 110 in order to enable the desired rhythmic effect.

Sustainer:

The sustainer 112 allows the user to sustain a played note for an indefinite duration. When the sustainer 112 is enabled, it sends an instruction to the rhythm generator 100. This instruction tells the rhythm generator 100 to interrupt its normal stream of "play note" messages and sustain the next played note until further notice. When the sustainer 112 is disabled, it sends an instruction to the rhythm generator 100 to silence the sustaining note and then resume normal note generation.

Riffer:

The riffer 104 is used to play back "riffs" which are pre-stored data structures that each contain: (i) a time-indexed list of "play note" events; and (ii) a list specifying a melodic direction offset (up or down, and by how much) for each of those "play note" events. This data structure enables the riffer 104 to automatically perform musical "riffs" for the purpose of melodic automation. Some examples of pre-stored riffs are: grace notes, mordents, trills, tremolos, and glissandi. Another use for riffs is to add melodic contours (e.g., arpeggios) when the rhythmic activity gets so high that it would be difficult for the user to add plausible melodic contours manually. When enabled, the riffer 104 transmits messages to the rhythm generator 100 and the note builder 102.

To the rhythm generator 100, the riffer 104 sends an instruction to stop generating rhythms when the rhythmic information for the note builder 102 starts being supplied by the riffer 104.

To the note builder 102, the riffer 104 sends an instruction to play a note (or chord) at the correct times as determined by the current riff. This "play note" instruction is also accompanied by a melodic offset, duration, and loudness (i.e., MIDI "velocity") as specified by the current rhythm block.

Licker:

The licker 114 allows the user to "capture" pleasing melodic fragments from the immediate past and replay them in rapid succession. Licks are stored in the same data structure format as riffs. However, licks are not pre-stored. The user's solo or melody is recorded automatically in the memory 22 of the computer 14 in real-time as it is created by the user. When the licker 114 is enabled (by the lick repeat button 54), it chooses a lick of random length from recent memory (usually a few beats or less) and saves the lick into the riff data format. The licker 14 then passes that lick to the riffer 104 along with an instruction to enable the riffer 104. The licker 114 then resumes recording the generated music.

Timbre Manager:

This functional block, the timbre manager 116, allows the user to affect the timbre of the current solo instrument. This is accomplished by sending the generated notes to multiple MIDI channels, each of which is using a different MIDI patch (timbre). The timbre manager 116 can then continually adjust the MIDI volume of these respective MIDI channels, thus changing the timbral "mix" of the output. Note that some MIDI tine generators also allow direct manipulation of timbre by controlling synthesis parameters. The default MIDI patches for each instrument are provided in the instrument configuration 76.

Envelope Manager:

The envelope manager 118 allows the user to modulate the pitch and loudness of sounding notes to achieve multiple effects such as pitch bends or crescendi. When enabled, the envelope manager 118 uses pitch bend and loudness (i.e., MIDI "velocity") envelopes to alter the playback of notes. These envelopes are either pre-stored (in which case they are provided in the instrument configuration 76) or controlled in real-time by signals from the input device 12. The envelope manager 118 also automatically adds minute random fluctuations in pitch to some instruments (specifically string and wind instruments) so as to mimic human performance imperfections.

Chord Builder:

The chord builder 120 directs the note builder 102 when to perform chords instead of single notes. When enabled, the chord builder 120 sends a message to the note builder 102 telling it: (i) how many chord notes to play in addition to the main melody note just created; (ii) how close together (in pitch) those chord notes should be; and (iii) whether those chord notes should be above or below the main melody note. This information is provided to the chord builder in the instrument configuration 76.

Articulator:

The articulator 122 allows the user to add articulation effects to the generated notes. Articulation is defined as the way in which individual notes are attacked and how much rest space is left between sequential notes. For example, if the "staccato" function of the articulator is enabled, it will send an instruction to the note builder 102 to shorten the duration of the next generated note. If the "slur" function of the articulator is enabled, it will send an instruction to the note builder 102 to lengthen the duration of the next generated note, and it will tell the note builder 102 to enable MIDI Porta Mode (with Porta Time=0), in which case the attack portion of the timbre envelopes of new notes will not be re-articulated. This is analogous to slurring notes on a traditional instrument.

Accenter:

The accenter 106 allows the user to add accent patterns to the generated notes. The accenter 106 has knowledge (from the style configuration 80) of all of the available rhythm blocks. The accenter 106 also has knowledge (from the rhythm generator 100) of which of those rhythm blocks are currently being used. When enabled, the accenter 106 uses this information to choose a complimentary rhythm block for use as an accenting template or an "accent block" in which a certain note or notes have a higher loudness value than the loudness of the corresponding note(s) in the rhythm block from the rhythm generator 100. At the times of the "play note" events defined by that accent block, the accenter sends messages to the note builder 102 instructing it to add a specified accent to any notes generated at that time.

Note Builder:

The note builder 102 combines all of the performance information from all of the other enabled functional blocks. As an example, the note builder 102 can integrate a "play note" instruction from the rhythm generator 100, a pitch from the pitch selector 108, a timbre adjustment from the timbre manager 116, a pitch bend value from the envelope manager 118, a duration value from the articulator 122, and a loudness (i.e., MIDI "velocity") value from the accenter 106. These data come into the note builder 102 and are integrated thereby and then sent out to the MIDI output device 16. Other outputs from the note builder 102 go to the pitch selector 108 and the licker 114.

When instructed by the chord builder 120 to play a chord, the note builder 102 causes the pitch selector 108 to execute X number of additional times in order to produce X number of pitches until the desired chord has been constructed, where X and the desired chord are determined the chordal parameters supplied by the chord builder 120.

To the memory buffer of the licker 114, the note builder 102 sends all of the note builder's output such that the licker 114 will always have a record of what has been played and will be able to perform its function (which is described hereinabove) when called upon by the user to do so.

MIDI Output Device:

This block 16 is the actual sound generating hardware (or, in some cases, software as mentioned previously) that "renders" the MIDI output stream from the note builder 102 meaning it translates the MIDI output stream into an audio signal which may then be amplified and broadcast.

MIDI Recorder:

The MIDI output stream from the note builder 102 also can be recorded. For example, the MIDI output stream can be sent to the hard drive 36 of the computer 14 and stored thereon. This allows a user to save his performance and easily access (e.g., listen to) it at any time in the future.

Automator:

The system of the invention thus clearly provides the user with a large number of control functionalities. Given enough buttons and faders, a user could independently control rhythm, pitch, sustain, riffs and licks, timbre, pitch envelopes, chords, articulation, and accents. However, such a great degree of control would be overwhelming for most users.

The purpose of the automator 130 is to act like a user's assistant and to automatically control many of these system functions thereby allowing the user to concentrate on just a few of them. The automator 130 is told which system functions to control by the skill level configuration 72.

In FIG. 10, the automator 130 is a different shape than all of the other blocks to indicate that it receives information from every block in FIG. 10 (even though all of the lines are not shown). The automator 130 has access to all of the information in the entire system, and it uses this information to decide when to enable various system functions.

As an example, the automator 130 can regularly or occasionally send pre-stored pitch-related input signals to the pitch selector 108. This might be done, for example, if the user has identified himself as having a very low skill level (i.e., a beginner) to the skill level configuration 72.

As another example, the automator 130 can regularly or occasionally send pre-stored rhythm-related input signals to the rhythm generator 100. Again, this might be done, for example, if the user has identified himself as having a very low skill level (i.e., a beginner) to the skill level configuration 72.

Another example is where the automator randomly or algorithmically enables one or more functional blocks (e.g., the timbre manager 116, the envelope manager 118, the chord builder 120, the articulator 122, the accenter 106, and/or the riffer 104) in order to add automatically complexity to the user's solo line.

One component of this complexity is instrument-specific performance parameters such as pitch bends and timbre substitutions (e.g., guitar harmonics). Another component of this complexity is automatic ornamentation of the score by the addition of effects such as grace notes, tremolos, glissandi, mordents, etc.

In general, the automator is an electronic system for processing a musical score to modify automatically the score by adding instrument-specific performance parameters or musical ornamentation. The musical score is represented by digital data such as MIDI data. The score can be the score that is created in real-time by the system according to the invention, or it can be a score which has been created in the past and stored or recorded on, for example, a computer hard disk drive or other computer-readable data storage medium.

Variations, modifications, and other implementations of what is described herein will occur to those of ordinary skill in the art without departing from the spirit and the scope of the invention as claimed. Accordingly, the invention is to be defined not by the preceding illustrative description but instead by the following claims.

What is claimed is:

1. A system for creating music in real time, comprising:

an input device including at least a first axis of manipulation and a second axis of manipulation, the input device for providing rhythm-related signals in response to a user's manipulation of the input device with respect to the first axis and for providing pitch-related signals in response to the user's manipulation of the input device with respect to the second axis; and a real-time music generator for receiving the rhythm-related and pitch-related signals from the input device and creating in real time music comprising (i) pitches based on the pitch-related signals and (ii) rhythmic activity based on the rhythm-related signals.

2. The system of claim 1 wherein the input device comprises a joystick having a movable handle which the user manipulates along the first axis to cause the joystick to provide the rhythm-related signals and along the second axis to cause the joystick to provide the pitch-related signals.

3. The system of claim 1 wherein the input device has the first and second axes arranged perpendicular to each other.

4. The system of claim 1 wherein the input device comprises a continuous controller.

5. The system of claim 1 wherein the input device comprises a mouse.

6. The system of claim 1 wherein the input device comprises a tracball.

7. The system of claim 1 wherein the input device comprises a fader.

8. The system of claim 1 wherein the input device comprises a slider.

9. The system of claim 1 wherein the input device comprises a spatial sensor.

10. The system of claim 1 wherein the input device comprises a discrete controller.

11. The system of claim 1 wherein the input device comprises a game pad.

12. The system of claim 1 wherein the input device comprises a plurality of switches.

13. The system of claim 1 wherein the input device comprises a plurality of buttons.

14. A method for creating music in real time, comprising:

(A) receiving rhythm-related signals provided in response to a user's manipulation of an input device with respect to a first axis of manipulation of the input device;

(B) receiving pitch-related signals provided in response to a user's manipulation of the input device with respect to a second axis of manipulation of the input device; and (C) creating in real time music comprising (i) pitches based on the received pitch-related signals and (ii) rhythmic activity based on the received rhythm-related signals.

15. The method of claim 14 wherein:

step (A) comprises receiving the rhythm-related signals which are provided in response to the user manipulating the input device along the first axis which is perpendicular to the second axis; and step (B) comprises receiving the pitch-related signals which are provided in response to the user manipulating the input device along the second axis which is perpendicular to the first axis.

16. The method of claim 14 wherein:

step (A) comprises receiving the rhythm-related signals which are provided in response to the user manipulating a handle of a joystick along the first axis; and step (B) comprises receiving the pitch-related signals which are provided in response to the user manipulating the handle of the joystick along the second axis.

* * * * *